Figure 1:
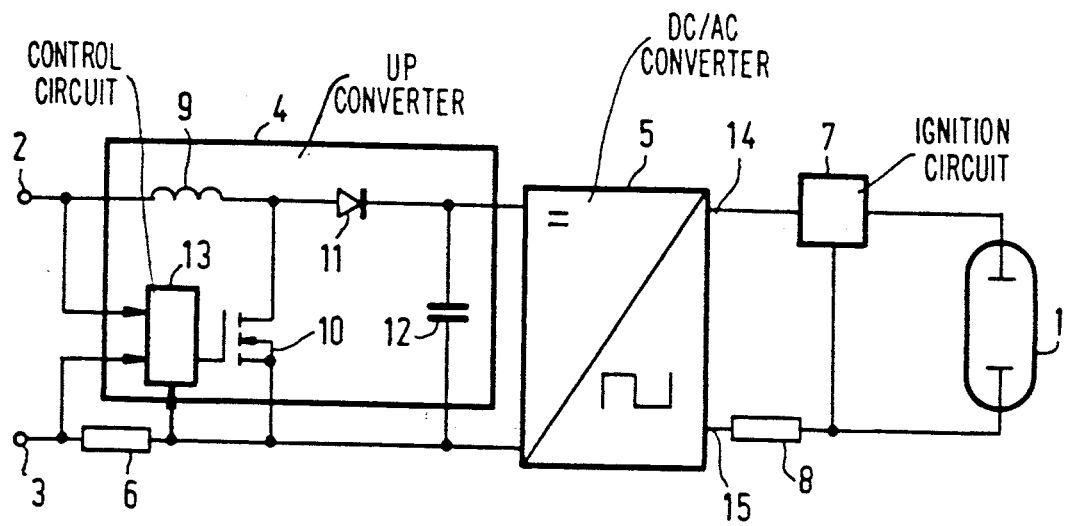

United States Patent [19]

Wegener

[11] Patent Number: 5,068,578

[45] Date of Patent: Nov. 26, 1991

[54] CIRCUIT ARRANGEMENT FOR SUPPLYING A LOAD

[75] Inventor: Armin Wegener, Aachen, Fed. Rep. of Germany

[73] Assignee: U. S. Philips Corporation, New York, N.Y.

[21] Appl. No.: 574,418

[22] Filed: Aug. 23, 1990

[30] Foreign Application Priority Data

Aug. 31, 1989 [DE] Fed. Rep. of Germany ..... 39288810

[51] Int. Cl.$^5$ .......................................... H05B 41/36
[52] U.S. Cl. ............................ 315/307; 315/DIG. 7; 315/291; 315/360; 363/37
[58] Field of Search ................. 315/307, DIG. 7, 291, 315/360; 363/37

[56] References Cited

U.S. PATENT DOCUMENTS

| | | | |
|---|---|---|---|
| 4,677,346 | 6/1987 | Roberts et al. | 315/226 |
| 4,870,327 | 9/1989 | Jorgensen | 315/307 |
| 4,914,356 | 4/1990 | Cockram | 315/307 |
| 4,952,846 | 8/1990 | van der Burgt et al. | 315/307 |

Primary Examiner—Eugene R. LaRoche
Assistant Examiner—Tan Dinh

[57] ABSTRACT

A circuit arrangement is described for supplying a load (1) from a direct voltage source (at 2,3) through a combinatorial circuit part (4) comprising a control circuit (13) for controlling the current the load (1) in a starting time interval after start of the operation. In order that a highest possible power is supplied to the load in a starting time interval after the start of the operation, the control circuit (13) is designed to carry out the following signal processing steps:

determining a starting value (Ia) for the current through the load (1) from a given power (Pzul) to be at most consumed by the load (1) and the voltage (Uq) delivered by the direct voltage source, driving - beginning after termination of a first delay time (t1) after start of the operation a reduction value (V) gradually increasing from zero to a final value from the starting value (Ia), forming a limiting current value (G) as a linear combination of the starting value (Ia) and the reduction value (V), supplying - beginning after termination of a second delay time (t2) after start of the operation of a regulation signal (R) of a regulator (4) whilst simultaneously limting the value of the regulation signal (R) to the limiting current value (G), and forming a control signal (S) for controlling the current through the load as a linear combination of the starting value (Ia), of the reduction value (V) and of the regulation signal (R).

13 Claims, 3 Drawing Sheets

CIRCUIT ARRANGEMENT FOR SUPPLYING A LOAD

The invention relates to a circuit arrangement for supplying a load from a direct voltage source through a circuit part, comprising a control circuit for controlling the current through the load in a starting time interval after it has been put into operation.

GB-A-2 080 054 discloses a supply circuit for a high-pressure gas discharge lamp, which permits of rapidly heating up the cold lamp. Moreover, fluctuations of the supply voltage should be eliminated and a rapid restarting should be rendered possible if the lamp is hot and was switched off for a short time. It should further be achieved that the heating-up current through the lamp has a smallest possible peak value. For this purpose, during the heating-up period, a substantially square-wave current is passed through the lamp, which is controlled by a control circuit, which keeps constant the sum of the current through the lamp and of the voltage applied across the lamp or at least a linear combination of the current and the voltage. As a result, a heating-up process is to be obtained in which the current through the lamp decreases proportionally to the increasing voltage at the lamp. In a practical embodiment of this circuit arrangement according to the prior art, for this purpose the sum of the voltage across a current measuring resistor, which is supplied by the current through the lamp, and across a voltage measuring resistor, which forms part of a resistance voltage divider bridging the lamp, is amplified as an absolute value and compared with a reference signal.

It has been found that in the circuit arrangement according to GB-OS 2 080 054 the ripple of the lamp current, i.e. its deviation from an ideal square wave form, shown in FIG. 7 thereof, strongly emerges in practical operation, especially with loads having a high power consumption, as long as an energy storge coil (choke coil) of high inductance and hence of high energy storage capacity is not used. However, such a coil is complicated and expensive and particularly has a high weight. Moreover, it has been found that in the circuit arrangement according to the prior art the power supplied to the load is comparatively small at the begining of the heating-up period so that the heating-up process is unnecessarily delayed.

The invention has for its object to provide a circuit arrangement of the kind mentioned in the opening paragraph, by which a highest possible power is supplied to the load in a starting time interval after it has been put into operation.

According to the invention, this object is achieved in that in a circuit arrangement of the kind mentioned in the opening paragraph, the control circuit is designed for carrying out the following signal processing steps:

determining a starting value for the current through the load from a given power to be at most consumed by the load and the voltage delivered by the direct voltage source, deriving—beginning upon the termination of a first delay time after the start of the operation—a reduction value increasing continuously from zero to a inal value from the starting value, forming a limiting current value as a linear combination of the starting value and the reduction value, supplying—beginning upon the termination of a second delay time after the start of the operation—a regulation signal from a regulator and simultaneously limiting the values of the regulation signal to the limiting current value, and forming a control signal for controlling the current through the load as a linear combination of the starting value. of the reduction value and of the regulation signal.

The circuit arrangement according to the invention ensures in a simple manner that the load is operated with the maximum power to be consumed, i.e. the highest admissible power, in the starting time interval. This is particularly advantageous when putting gas discharge lamps into operation. For example, it is envisaged to use high-pressure gas discharge lamps as car illumination. When such an illumination is put into operation, the full light output must be available as soon as possible after the lamp has been put into operation. A very short starting time interval, i.e. a very rapid heating-up of the lamp to the operating temperature, is therefore absolutely necessary. The circuit arrangement according to the invention renders this possible and at the same time represents an effective protection of the lamp from thermal or electrical overload. In contrast with the circuit arrangement according to GB-OS 2 080 054, according to the invention, it can moreover be achieved that the peak current through the load does not exceed the effective value. This means that thermal and electrical load limits in the sense of an undangerous utilization of highest possible powers in the load can be caused to approach each other more closely.

In the circuit arrangement according to the invention, moreover a choke coil of voluminous construction is avoided so that as a whole a light and manipulable device is obtained. This is particularly advantageous for the use as a ballast unit of a high-pressure gas discharge lamp. The circuit arrangement according to the invention, however, may also be used for differently constructed loads, for example for controlling the starting operation of an electric motor.

The circuit arrangement according to the invention may also be provided in the form of an analog or a digital switching arrangement with a microprocessor. In this case, individual functions may be carried out arbitrarily in an analog or a digital manner and the corresponding signal processing stages may be combined in different ways.

In a preferred embodiment, the control circuit comprises a nominal value generator for determining the starting value for the current through the load as a quotient from the given power and the measured voltage of the direct voltage source. This corresponds to the physically exact solution to calculate the highest admissible current through the load from the given highest admissible power. The power is then given as a fixedly assumed value, which is calculated from the dimensioning of the load to be supplied. A ratio between the power supplied from the direct voltage source, the power dissipation occurring in the circuit arrangement and the power consumed by the load obtained from the dimensioning of the whole arrangement can be taken into account in this calculation, in order to obtain from the measurement of the voltage supplied by the direct voltage source a correct determination of the current through the load and hence of the power consumed thereby.

In a simpler embodiment of the control circuit and particularly of the nominal value generator, the starting value for the current through the load can be determined as a difference between a value representing the given power and the measured voltae of the direct voltage source at a selectable working point. The "power hyperbola" in this working point is approximated by a straight line. In this embodiment the fact is taken into account that a subtraction circuit is to be constructed more simply than a dividing circuit, while the deviations from the ideal operating conditions caused by this simplification must be taken into the bargain.

An adaptation as exact as possible of the current to be supplied to the load and hence of the power consumed by it to the operating conditions prevailing there at any instant is attained if especially the variation with time of the reduction value is tuned to the variation with time of these operating conditions. According to an advantageous embodiment of the invention, in which the load comprises a gas discharge lamp, this is achieved in that the time constant for the increase of the reduction value can be tuned to the heating-up time of the gas discharge lamp after it has been put into operation and that optionally also a time constant for a decrease of the reduction value after the lamp has been put out of operation can be tuned to the colling time of the gas discharge lamp.

Further advantageous embodiments of the circuit arrangement according to the invention are defined in the remaining subclaims.

Figure 2:
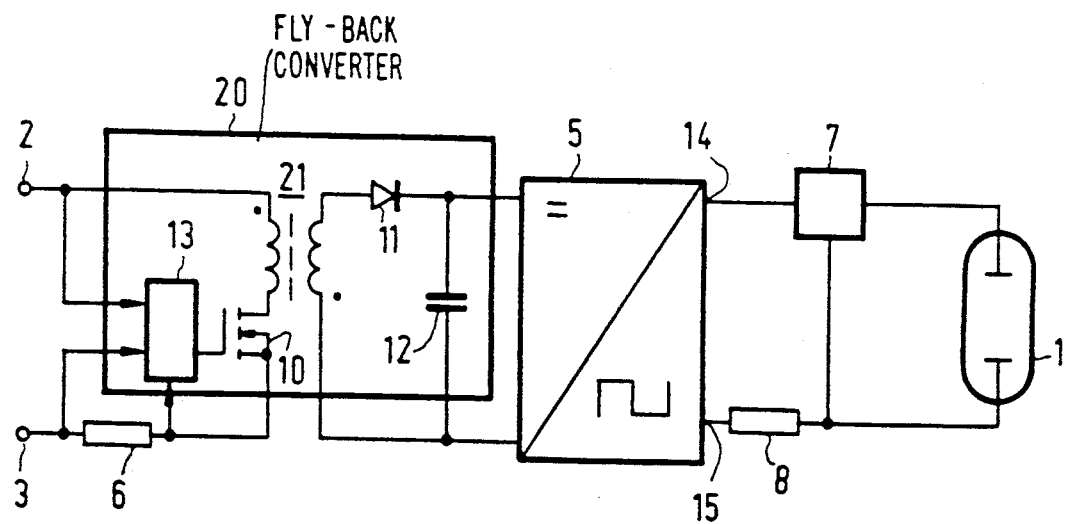
Figure 3:
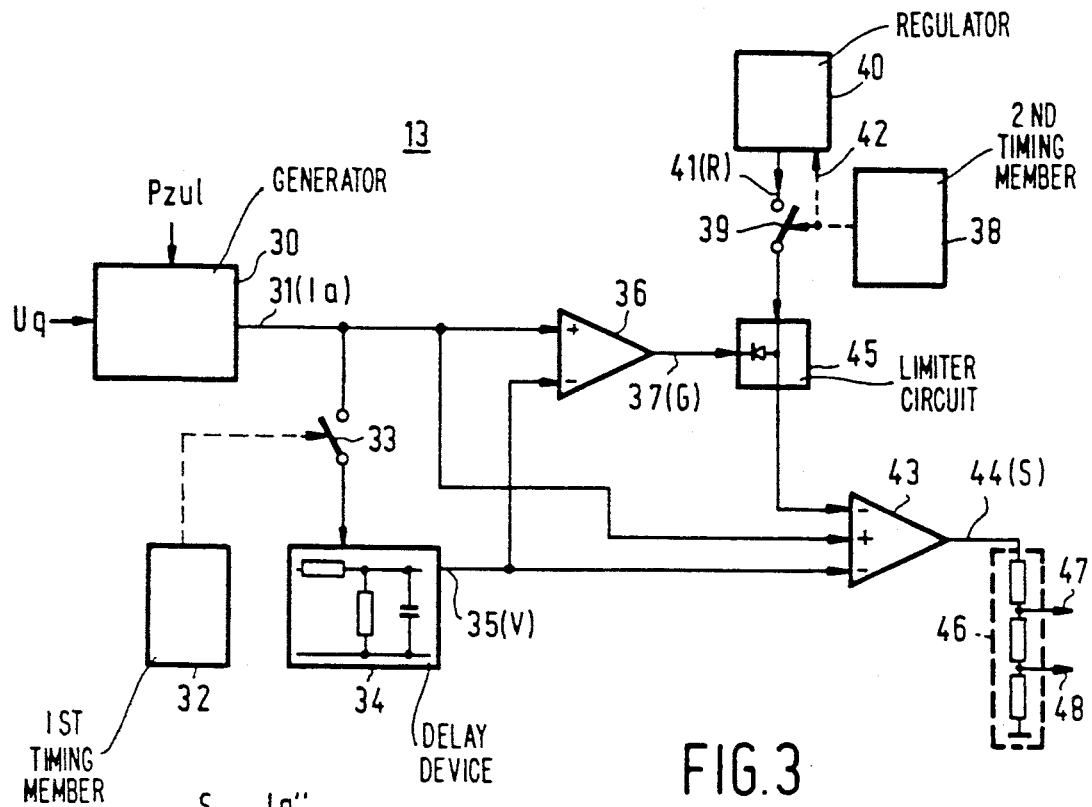
Figure 4:
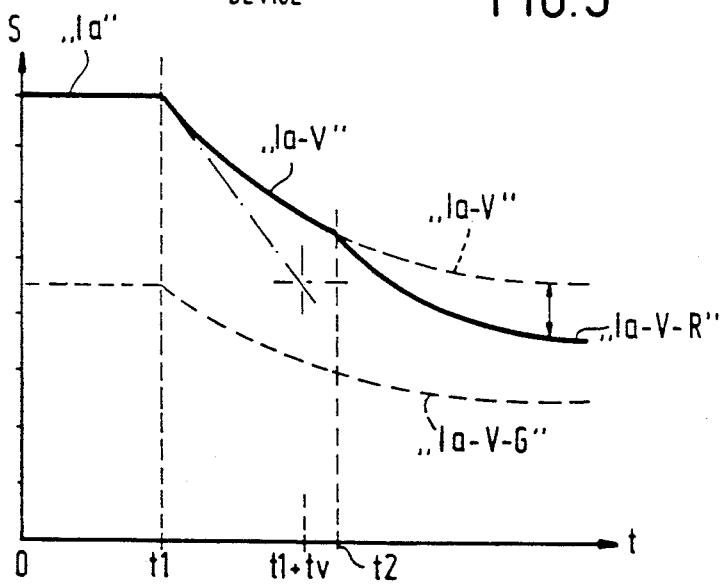
Figure 4:
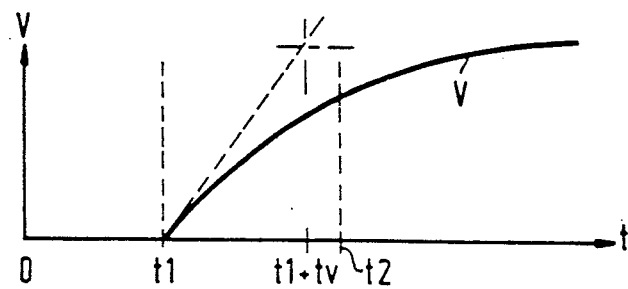
Figure 5:
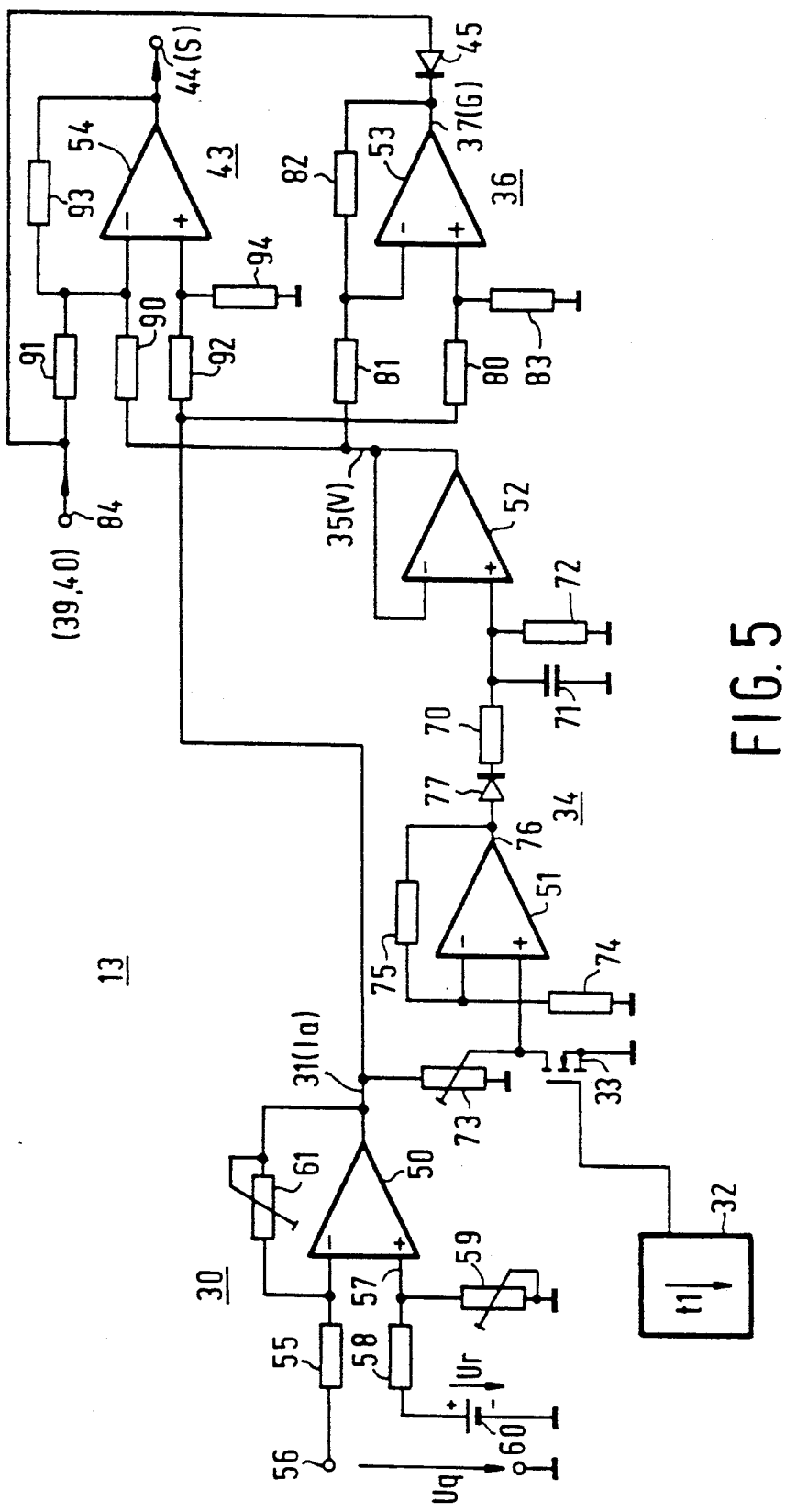

Embodiments of the invention are shown in the drawing and are described more fully hereinafter. In the drawing:

FIGS. 1 and 2 show examples for circuit arrangements for supplying a load from a direct voltage source through a combinatorial circuit part, FIG. 3 shows a block circuit diagram of an embodiment of a control circuit constructed in accordance with the invention, FIG. 4 shows time diagrams for the explanation of the operation of the control circuit shown in FIG. 3, FIG. 5 shows in detail an embodiment of a control circuit.

FIG. 1 shows an embodiment for a circuit arrangement, by which a high-pressure gas discharge lamp 1 is supplied as a load from a direct voltage source (not shown) connected to two supply terminals 2, 3 with energy through a combinatorial circuit part in the form of an up converter 4 and a DC/AC converter 5. The up converter 4 comprises an inductor 9, which is provided with a chopper switch 10 and a current measuring resistor 6 arranged outside the up converter 4 in series between the supply terminal 2 and 3. The chopper switch 10 is constituted in the present case by a field effect transistor. From the junction point between the series inductor 9 and the chopper switch 10, a further current path extends through a diode 11 to a storage capacitor 12. From this capacitor a supply voltage is derived for passing energy further on to the DC/AC converter 5.

In the DC/AC converter 5, the direct voltage derived from the storage capacitor 12 is supplied in the rhythm of a fixed change-over frequency alternately in different polarity through output terminals 14, 15 to the load 1. In the embodiment shown in FIG. 1, an ignition circuit 7 is connected between the output terminals 14, 15 and the load 1—in this case a high-pressure gas discharge lamp—, which ignition circuit produces in known manner upon the start of the operation high-voltage pulses for igniting the high-pressure gas discharge lamp 1. A resistor 8 can be introduced optionally—as shown—into the current path through the load 1.

The up converter 4 further comprises a control circuit 13, which produces high-frequency control pulses, by means of which the chopper switch 10 is switched on and off in rapid succession. Preferably, a repetition frequency of the control pulses above 20 kHz is chosen. Due to the shape of the control pulses, the current taken up by the up converter 4 from the direct voltage source can be controlled. For control purposes, the control pulses are varied, for example, according to a pulse width modulation or according to a hysteresis control. An example for the last-mentioned control method is known from EP-A-59 053, to which reference is emphatically made with respect to details. The current taken up by the up converter 4 is detected by a current measuring resistor 6. In the control circuit, two nominal current values, i.e. an upper and a lower nominal value, are determined. The chopper switch 10 is cut off when the current increases and the upper nominal value is attained and is switched again to the conducting state when the current through the current measuring resistor 6 decreases and the lower nominal value is attained. The average value of the current thus produced at the supply terminals 2, 3 multiplied by the voltage across these supply terminals 2, 3 results in the power taken up by the circuit arrangement from the direct voltage source.

FIG. 2 shows a further embodiment for a circuit arrangement for supplying the load 1, in which the up converter 4 is exchanged for a fly-back converter 20. The remaining circuit elements correspond to those of FIG. 1 and are provided again with the same reference symbols. This also applies to the elements contained in the fly-back converter 20, which differ from those of the up converter 4 substantially only in that the inductor 9 is replaced by a transformer 21. As a result, on the one hand a D.C. separation between the direct voltage source and the load 1 and on the other hand a larger range of values for the choice of the voltage to be supplied to the DC/AC converter 5 and hence to the load 1 is obtained.

FIG. 3 shows blockdiagrammatically an embodiment for a construction according to the invention of the control circuit 13 of FIGS. 1 and 2. It comprises a nominal value generator 30, in which a starting value Ia is determined from a given value for the power Pzul to be at most consumed by the load and from a measured value of the voltage Uq supplied by the direct voltage source and is made available at an output 31. The value for the power Pzul to be at most consumed by the load is fixedly defined and is determined, whilst taking into account the known power dissipations in the combinatorial circuit part 4 or 20 as well as in the DC/AC converter 5, in the current measuring resistor 6 and, as the case may be, in the resistor 8. In contrast with this fixedly adjusted value Pzul, the voltage Uq represents the voltage actually supplied at any instant by the direct voltage source to the supply terminals 2, 3, which voltage is supplied to the control circuit 13 through direct connections shown in FIGS. 1 and 2 from the supply terminals 2, 3. For an exact determination of the starting value Ia, the nominal value generator 30 comprises a division device for dividing the value Pzul by the value Uq. In a simplified embodiment, only a subtraction device for subtracting a value representing the voltage Uq from the given value representing the power Pzul is provided in the nominal value generator 30. As a result, a simplification of the circuit is possible with only slightly reduced accuracy. This difference is formed at a selectable working point, in whose proximity the straight characteristic curve obtained during the subtraction deviates only slightly from the exact hyperbola-shaped characteristic curve.

The control circuit 13 according to FIG. 3 further comprises a first time-determining member 32, which passes a first switch 33 to a conductive state after termination of a first delay time t1 after the circuit arrangement has been put into operation. As a result, the starting value Ia is passed after termination of the first delay time t1 after the circuit arrangement has been put into operation from the output 31 of the nominal value generator 30 to a delay device 34. The delay device 34 derives from the starting value Ia a reduction value increasing—beginning from zero—continuously to a final value and makes this value available at an output 35. As shown in FIG. 3, the delay device 34 is preferably constituted by an RC network, in which the gradually increasing reduction value is produced by charging a capacitance by the signal representing the starting value Ia through the first switch 33. The time constant of the increase of the reduction value indicated by V is designated in the present embodiment by tv.

From the starting value Ia and the reduction value V, a limiting current value G is formed as a linear combination in a succeeding first adder circuit 36. In the simplest case, the said linear combination consists of the difference between the starting value Ia and the reduction value subtracted therefrom; the two values A and V can be multiplied during this combination by arbitrary common or individual amplification factors, however. As a result, the limiting current value V can assume a value range favourable for the following signal processing. It is made available at an output 37 of the first adder circuit 36.

Upon termination of a second delay time t2 after the circuit arrangement has been put into operation, a second switch 39 is passed to the conductive state through a second time-determining member 38 also contained in the control circuit 13 according to FIG. 3 and consequently a signal connection is established from regulator 40 for a regulation signal R, which is delivered by the regulator 40 at its output 41. The second time-determining member 38 can be operatively connected moreover with the regulator 40 through its release input 42 in such a manner that the regulator 40 forms only after termination of the second delay time t2 after the circuit arrangement has been put into operation a regulation signal R preferably beginning with the value zero and is made inoperative before this instant.

In a second adder circuit 43 also contained in the control circuit 13 according to FIG. 3, a control signal S for controlling the current through the load 1 is formed as a linear combination of the starting value Ia, of the reduction value V and of the regulation signal R. By the second adder circuit 43, this control signal S is supplied to an output 44. In the second adder circuit 43, the reduction value V and the regulation signal R are preferably combined—in a sense opposite to that of the starting value Ia—with this value to form the control signal. More particularly, the reduction value V and the regulation signal R are subtracted from the starting value Ia. The regulation signal R therefore acts, like the reduction value V, in the sense of a decrease of the starting value Ia and hence a decrease of the power initially supplied to the load upon the value maintained in the continuous mode of operation. As in the first adder circuit 36, it is also possible in the second adder circuit 43 to multiply besides a direct difference between the individual input quantities (starting value Ia, reduction value V, regulation signal R) each of these quantities by a selectable factor and only then to superimpose them additively on each other (or to subtract them from each other), so that also in this case an arbitrary linear combination can be obtained for controlling a desired value range of the control signal S at the output 44.

In the embodiment of FIG. 3, the regulation signal R of the regulator 40 is not supplied by the second time-determining member 38 through the second switch 39 directly to the second adder circuit 43, but is supplied thereto through a limiter circuit 45. The limiter circuit 45 serves to limit the values of the regulation signal R to the limiting current value G or a value directly associated therewith. Since the regulation signal R for forming the control signal S in the second adder circuit 43 is utilized with negative polarity, its limitation leads to maintaining a minimum value for the control signal S, which depends only upon the starting value Ia and upon the reduction value in the form of a linear combination of these two quantities. Since both the starting value Ia and the reduction value V are directly determined by the dimensioning of the load 1, therefore the reduction value for the control signal S can be defined immediately after this dimensioning. It serves to ensure that upon fluctuations of the operating conditions of the load and hence upon variations of the regulation signal R the current through the load 1 does not fall below a minium value required for its reliable continuous operations. This is particularly of importance for the operation of a gas discharge lamp as the load 1 because such lamps extinguish when the value flowing through them falls below a minimum value. However, in given applications of the lamps, for example as car illumination, such an extinguishing is not permissible and must therefore absolutely be avoided.

In the simplest case shown in FIG. 3, the limiter circuit 45 comprises a diode, through which a regulation signal R exceeding the limiting current value G flows towards the low-ohmic output 37 of the first adder circuit 36.

Since the formation of the regulation signal R in the regulator 40 after termination of the starting time interval is not the subject matter of the invention, in this description the inner construction of the regulator 40 is not disclosed further. The regulator 40 may comprise, for example, a regulation of the colour temperature for a gas discharge lamp, a regulation of the speed for an electric motor, a temperature regulation for a heating or the like. Such regulators are known in principle.

From the output 44 of the second adder circuit 43, the control signal S arrives as a supplying voltage at a resistance voltage divider 46. In the embodiment of FIG. 3, the latter comprises two tappings 47, 48 and is connected to earth at its end arranged opposite to the output 44. At the "higher" tapping 47, an upper current nominal value and at the "lower" tapping 48 a lower current nominal value for a control of the chopper circuit 10 according to a hysteresis control is available, as is known from EP-OS 59.053.

As explanation of FIG. 3, FIG. 4 shows in the upper part the time variation of the control signal S and in the lower part the time variation of the reduction value V. The circuit arrangement is put into operation at the instant "0". From this instant till the termination of the first delay time t1, both the reduction value V and the regulation signal R disappear. Consequently, in this time interval the control signal S corresponds to the starting value Ia.

After the first delay time t1 has been exceeded, the reduction value V gradually increases with the time constant tv in the form of an exponential function to a final value. Correspondingly, the control signal S decreases according to the difference Ia-V gradually till the instant at which upon termination of the second delay time t2 the regulation signal R is passed through the second switch 39 to the second adder circuit 43 and consequently the control signal S is additionally reduced by this regulation signal R. With respect to the difference curve between the starting value Ia and the reduction value V, the time variation of the control signal S once more decreases correspondingly.

In the upper diagram of FIG. 4, for comparison the difference between the starting value Ia on the one hand and the sum of the reduction value V and of the limiting current value G on the other hand is indicated by a broken line. Exactly, however, with all the variations shown in this part of the diagram linear combinations of the quantities described are concerned, into which the latter are introduced with different factors. This is indicated by the inverted commas at the superscription of the curves. The curve "Ia-V-G" forms the lower limit for the control signal S, which, as described, is defined by the limiter circuit 45. In the present embodiment, moreover it is assumed that the regulation signal R does not assume negative values so that the curve "Ia-V" forms the upper limit of the value range of the control signal S. The gradual transition of the control signal after the instant t2 takes place by gradual adjustment of the regulation signal R to a given operating value and may also assume other time variations in accordance with the construction of the regulation, i.e. of the regulator 40.

The time constant tv is preferably tuned to the behaviour of the load 1 in the starting time interval. More particularly, if the load 1 comprises a gas discharge lamp, the time constant tv for the increase of the reduction value V can be tuned to the heating-up time of this gas discharge lamp after the circuit arrangement has been put into operation. Correspondingly, also a time constant for a decrease of the reduction value V after the load 1 and hence the gas discharge lamp contained therein has been put out of operation may be tuned to the cooling time thereof. Thus, it is achieved that the reduction value V is adapted in accordance with the operating parameters of the gas discharge lamp, more particularly the current-carrying capacity determined by the lamp temperature. In the case of short interruptions of the operation, in which the gas discharge lamp is not cooled completely or is cooled only slightly, a restart can then take place independently of the operation condition concerned under optimal conditions.

FIG. 5 shows a somewhat more detailed embodiment for a control circuit 13, in which elements and signals already described are again provided with the same reference symbols. For a simple and inexpensive construction, standard operational amplifiers have been used in the whole arrangement.

In the embodiment of FIG. 5, the nominal value generator 30 comprises a first operational amplifier 50, to which the voltage Uq applied between an input terminal 56 and earth and delivered by the direct voltage source is supplied at the inverting input through an input resistor 55. When used in a circuit arrangement according to FIGS. 1 and 2, for example, the input terminal 56 would be connected, to the supply terminal 2 and the earth terminal to the supply terminal 3. The non-inverting input of the first operational amplifier 50 is connected to the tapping 57 of a voltage divider consisting of a fixed resistor 58 and of a first potentiometer 59 and fed by a reference voltage Ur from a reference voltage source 60. A second potentiometer 61 serves as a feedback from the output 31 of the nominal value generator 30 and hence of the first operational amplifier 50 to its inverting input.

The first operational amplifier 50 forms with its circuitry the starting value Ia from a linear combination of the power Pzul to be at most consumed by the load and of the voltage Uq delivered by the direct voltage source according to a straight characteristic curve passing through a working point. The initial value and the rise of this straight line are adjusted by the adjustment of the first and of the second potentiometers 59,61. The dimensioning of the nominal value generator 30 preferably takes place according to the following equation:

$$Ia = Pzul(0.5X - Uq)/Y,$$

where X is the square value of the sum of the square roots of the lower and the upper limit value of the voltage Uq delivered by the direct voltage source and Y is the product of these limit values. Due to this dimensioning, the average square error becomes minimal. The starting value Ia can then be defined—deviating with an error of less than 4% upwards or downwards from the exact value—for a value range of the voltage Uq delivered by the direct voltage source, which value range can deviate by 25% upwards or downwards from a nominal value of the direct voltage source. With the adjustment of the first and the second potentiometers 59 and 61, moreover different values of the ratio of the power losses occurring in the circuit arrangement to the power consumed by the load can be compensated with different values of the voltage Uq.

The delay device 34 is constituted in the circuit according to the embodiment of FIG. 5 by a combination of a charge resistor 70 and the parallel combination of a capacitor 71 and a discharge resistor 72. This RC network 70, 71, 72 is charged through a second operational amplifier 51. The starting value Ia of the output 31 is supplied to the operational amplifier 51 at its non-inverting input through a third potentiometer 73. The inverting input of the second operational amplifier 51 is connected to earth through a second input resistor 74 and to the output 76 of the second operational amplifier 51 through a first feedback resistor 75. A protection diode 77 between the output 76 and the charge resistor 70 prevents a discharge of the capacitor 71 through the low-ohmic output 76 when the second operational amplifier 51 is switched off. In order to attain a highest possible high-ohmic coupling-out of the reduction value V from the capacitor 71, the latter is connected to the non-inverting input of a third operational amplifier 52, whose output is shortcircuited with respect to its inverting input. The output of the third operational amplifier 52 at the same time constitutes the output 35 of the delay device 34.

By the first time-determining member 32, according to FIG. 5 a transistor acting as the first switch is controlled, which—beginning with the start of the operation of the circuit arrangement till the termination of the first delay time t1—is switched to the conductive state and hence prevents the supply of the starting value Ia through the third potentiometer 73 to the non-inverting input of the second operational amplifier 51. Only after termination of the shortcircuit formed by the first switch 33, the second operational amplifier 51 begins to charge the capacitor 71.

The first adder circuit 36 comprises in the embodiment of FIG. 5 a fourth operational amplifier 53, to whose non-inverting input the starting value Ia is supplied through a third input resistor 80 and to whose inverting input the reduction value V is supplied through a fourth input resistor 81. From the output of the fourth operational amplifier 53, which constitutes at the same time the output 37 of the first adder circuit 36, a second feedback resistor 82 is connected to the inverting input of the fourth operational amplifier 53, and its non-inverting input is connected to earth through a fifth input resistor 83.

The limiter circuit 45 is constituted by a diode, whose cathode is connected to the output 37 of the first adder circuit 36 and whose anode is connected to a terminal 84, at which the regulation signal R of the regulator 40 is supplied through the second switch 39.

The second adder circuit 43 is constituted in FIG. 5 by a fifth operational amplifier 54, to which the reduction value V at the output 35 is supplied at its inverting input through a sixth input resistor 90 and the regulation signal R at the terminal 84 is supplied through a seventh input resistor 91. Through an eight input resistor 92, the starting value Ia is applied to the non-inverting input of the fifth operational amplifier 54. In a similar manner as in the first adder circuit 36, also in the fifth operational amplifier 54 of the second adder circuit 43 a third feedback resistor 93 is connected between the output which constitutes the output of the second adder circuit 43 and the inverting input, while from the non-inverting input a ninth input resistor 94 is connected to earth. Therefore, in the fifth operational amplifier 54 the regulation signal R, the reduction value V and the starting value Ia are additively combined according to the ratio of the values of the sixth to the eight input resistor 90 to 92 and according to the sign of the associated input of the fifth operational amplifier 54.

Instead of a second time-determining member 38 defining a fixed second delay time t2, an arrangement may advantageously be provided, by which the second delay time t2, i.e. the instant at which the regulation signal R is switched to the second adder circuit 43, is adjusted in dependence upon the actual temperature of a gas discharge lamp contained in the load 1. This arrangement (not shown) is based on the condition that the time constant tv of the charge of the capacitor 71 and its discharge time constant are adapted as far as possible to the heating and cooling of the gas discharge lamp. The reduction value V can then be compared with the starting value Ia, for example in the first adder circuit 36 or in a correspondingly constructed signal processing stage. As soon as the difference between these values falls below a given value, the second switch 39 is passed to the conductive state and hence the regulation signal R is passed on to the second adder circuit 43. The regulation of the load 1 then invariably starts under the same operating conditions.

I claim:

1. A circuit arrangement for supplying a load (1) from a direct voltage source (2,3) through a circuit part (4), comprising a control circuit (13) for controlling the current through the load (1) in a starting time interval after it has been put into operation, characterized in that the control circuit (13) includes
   determining means for determining a starting value (Ia) for the current through the load (1) from a given power (Pzul) to be at most consumed by the load (1) and the voltage (Uq) delivered by the direct voltage source,
   deriving means for deriving—beginning after termination of a first delay time (t1) after start of the operation a reduction value (V) gradually increasing from zero to a final value from the starting value (Ia),
   first forming means for forming a limiting current value (G) as a linear combination of the starting value (Ia) and the reduction value (V),
   supplying means for supplying—beginning after termination of a second delay time (t2) after start of the operation on a regulation signal (R) of a regulator (4) whilst simultaneously limiting the value of the regulation signal (R) to the limiting current value (G), and
   second forming means for forming a control signal (S) for controlling the current through the load as a linear combination of the starting value (Ia), of the reduction value (V) and of the regulation signal (R).

2. A circuit arrangement as claimed in claim 1, characterized in that the control circuit (13) comprises a nominal value generator (30) for determining the starting value (Ia) for the current through the load (1) as a quotient of the given power (Pzul) and the measured voltage (Uq) of the direct voltage source.

3. A circuit arrangement as claimed in claim 1, characterized in that the starting value (Ia) for the current through the load (1) can be determined as the difference between a value representing the given power (Pzul) and the measured voltage (Uq) of the direct voltage source at a selectable working point.

4. A circuit arrangement as claimed in claim 1, characterized in that the control circuit (13) comprises a first time-determining member (32) for passing on the starting value (Ia) after termination of the first delay time (t1) and a delay device (34) for deriving the reduction value (V).

5. A circuit arrangement as claimed in claim 4, characterized in that the delay device (34) comprises an RC network (70, 71, 72).

6. A circuit arrangement as claimed in claim 1, characterized in that the control circuit (13) comprises a first adder circuit (36) for forming the limiting current value (G).

7. A circuit arrangement as claimed in claim 1, characterized in that the control circuit (13) comprises a second adder circuit (43) for forming the control signal (S).

8. A circuit arrangement as claimed in claim 1, characterized in that in the control signal (S) the reduction value (V) and the regulation signal (R) are combined in a sense opposite to that of the starting value (Ia).

9. A circuit arrangement as claimed in claim 7, characterized in that the control circuit (13) comprises a second time-determining member (38) for passing on the regulation signal (R) on to the second adder circuit (43).

10. A circuit arrangement as claimed in claim 9, characterized in that the regulation signal (R) can be supplied to the second adder circuit (43) through a limiter circuit (45).

11. A circuit arrangement as claimed in claim 1, characterized in that the load (1) comprises a gas discharge lamp.

12. A circuit arrangement as claimed in claim 1, characterized in that the time constant (tv) of the increase of the reduction value (V) can be tuned to the heating-up time of the gas discharge lamp after it has been put into operation, and wherein the control circuit (13) comprises a first time-determining member (32) for passing on the starting value (Ia) after termination of the first delay time (t1) and a delay device (34) for deriving the reduction value (V) and wherein the load (1) comprises a gas discharge lamp.

13. A circuit arrangement as claimed in claim 1, characterized in that the load (1) comprises a gas discharge lamp and wherein the control circuit (13) comprises a first time-determining member (32) for passing on the starting value (Ia) after termination of the first delay time (t1) and a delay device (34) for deriving the reduction value (V) and wherein a time constant for a decrease of the reduction value can be tuned to the cooling time of the gas discharge lamp after the load (1) has been put out of operation.

* * * * *